United States Patent Office 3,729,423
Patented Apr. 24, 1973

3,729,423
SOLID ACID CONTAINING PEELING TYPE PICKLING COMPOSITION
Nobuyoshi Hirota, Nagasaki, Japan, assignor to Mitsubishi Jukogyo Kabushiki Kaisha, Tokyo, Japan
No Drawing. Filed Apr. 6, 1971, Ser. No. 131,786
Claims priority, application Japan, Apr. 30, 1970,
45/36,423
Int. Cl. C11d 7/08; C23g 1/02
U.S. Cl. 252—142       5 Claims

ABSTRACT OF THE DISCLOSURE

A peelable composition suitable for pickling is prepared from sodium alginate, gelatin, starch, a water-soluble resin and a penetrant.

---

The present invention relates to peelable compositions for pickling.

It has been proposed by Hirota et al. in patent application Ser. No. 102,917 filed Dec. 30, 1970, to make peelable, film-forming compositions for pickling which consist essentially of sodium alginate, having the property of gelling by the influence of an acid and the iron salt formed by said acid with, or without, gelatin, with starch, bentonites, talc, silica, or terra alba, a penetrant and further, if necessary, inhibitor mixed therewith. Such composition, as pickling agents, are epoch-making ones to substitute for the conventional dipping process, but in the atcual removal of rust and mill scale from steels using said compositions, the compositions are used in the form of slurry upon mixing liquid acids therewith. It has been found that the compositions of the prior application, therefore, still have a room of improvement in respect of storage and transportation. Namely, the compositions of the prior application, when contained in a container in the form of a viscous liquid upon mixing them with a film-forming agent and a liquid acid, have a shelf life of about 48 hours, change into the state of gel in a few days and the use thereof becomes extremely difficult, due to the mutual reaction of the components.

Further, if the compositions are prepared for use at the site of use immediately before the use, by mixing them with the film-forming agent and the liquid acid which are contained in separate containers respectively, the two containers must always be provided, which renders the storage and transportation cumbersome and is uneconomical due to the costs of the containers. Furthermore, since in either method described above, the acid is stored and transported in the state of aqueous solution, the costs of storage and transportation increase and consequently add to the unit cost of the composition.

In view of the foregoing, the present invention has been achieved with a view to obtaining a powdery, peelable composition for pickling which is easy in handling and transportation, and consists of peelable compositions for pickling which is composed of a film-forming agent, and a solid acid and an iron dissolution promoter blended therewith, said film-forming agent consisting essentially of sodium alginate, having the property of gelling by the influence of an acid and the iron salt formed by said acid, and gelatin, with starch, a water-soluble resin and a penetrant mixed therewith. The present invention will be described in detail hereinunder.

As a base material of the compositions used in the present invention, there are used sodium alginate having the property of gelling by the influence of an acid and the iron salt formed by said acid, and gelatin. The base material is mixed with starch, a water-soluble resin, a penetrant, a dissolution promoter and a solid acid. The water-soluble resins act to increase the toughness of a gelled film, and includes polyacrylamide, methyl cellulose, carboxymethyl sodium cellulose, water-soluble alkyd resin, water-soluble phenol formaldehyde resin, water-soluble melamine formaldehyde resin and water-soluble acrylic resin, e.g., sodium polyacrylate. The penetrant causes the acid to quickly penetrate deep into the rust or mill scale on the surface to be treated and to demonstrate its rust-removing effect in a short period of time, and a non-ionic powdered surface agent is used, for instance, octyl-phenol-10-ethylene oxide. An inhibitor, such as Acitrol 3129 (a product of Horton Company), may be incorporated to prevent the core material from being unnecessarily corroded after the rust has been removed.

Further, a dissolution promoter can be added for the purpose of enabling the acid to quickly dissolve the rust or mill scale, and acid ammonium fluoride and stannous chloride are used for example. For the acid, ultraphosphoric acid is used as solid acid. The ultraphosphoric acid is represented by the general formula $(xH_2O)P_2O_5$ and is polymerized phosphoric acid having a molar ratio of $0 < x < 1$. Instead of the ultraphosphoric acid, polymerized phosphoric acids may be used which are represented by polyphosphoric acid $H_{n+2}P_nO_{3n+1}$ ($n=2, 3, 4, 5$).

Next, the rust removing action of the compositions of the present invention when the compositions are mixed with a predetermined amount of water and applied to the surface to be treated of a steel sheet, will be explained.

First of all, the acid increases the pH of the composition while performing the rust-removing action by dissolving the rust. The liquid acid, in this case, quickly penetrates deep into the rust by the action of the penetrant which is incorporated for causing the rust-removing effect to be quickly exhibited. In the process of the rust-removing action during the period wherein the pH of the composition is raised to 3 from below 3, the sodium alginate reacts with $Fe^{+++}$ ion to form iron alginate by the rust-removing action and provides a gelling action. As the rust-removing action further proceeds, the pH of the composition changes from 3 to 6, during which period the gelatin present in the composition gels quickly. This is because this pH range corresponds to the isoelectric point of gelatin and the gelatin has the property of quickly gelling in this pH range. The starch present in the composition is formed into a film in about 1–2 hours at normal temperature while having the water contained therein dissipated, using the gel of sodium alginate and gelatin, formed as described above, as a base. The water-soluble resin in the composition assists the formation of a continuous film at the time of gelation, and the dissolution promotor serves to promote the rust or mill scale dissolving action of the acid. By leaving the composition thus applied to stand for about 4 hours, the rust-removing action is completed and finally, the film is peeled, whereby a fresh metal surface completely free of rust or mill scale can be obtained.

The compositions of the present invention and the action thereof are as described above. The practical formulations of the compositions will be shown below:

FORMULATION 1

| | Parts by weight |
|---|---|
| Sodium alginate (AG Gum [1]) | 6 |
| Gelatin | 0.5 |
| Starch | 20 |
| Water-Soluble Resin (Cellogen 3H [2]) | 1 |
| Ultraphosphoric acid | 15 |
| Acid ammonium fluoride. (Dissolution Promoter) | 1 |
| Surface active agent. (Nonion type, powdery) (Solgen 50 [3]) | 0.5 |

[1] AG Gum: Trade name of a product of Daiichi Kogyo Yakuhin.
[2] Cellogen 3H: Trade name of a product of Daiichi Kogyo Yakuhin.
[3] Solgen 50: Trade name of a product of Daiichi Kogyo Yakuhin.

The ingredients mixed in the proportions set forth above are milled into particles of 0.5 mm. or smaller by means of a mill. The mixture is added in 50 parts by weight of lukewarm water at 40–50° C. with stirring before the use. The ultraphosphoric acid may be varied within the range of 5–20 parts by weight, but the most remarkable rust-removing effect is obtained in the range of 15–20 parts by weight.

FORMULATION 2

| | Parts by weight |
|---|---|
| Sodium alginate (AG gum) | 10 |
| Gelatin | 0.3 |
| Starch | 15 |
| Water-soluble resin (Kogum [4]) | 0.5 |
| Polyphosphoric acid | 5 |
| Citric acid | 15 |
| Stannous chloride. (Dissolution Promotor) | 1 |
| Powdered nonionic surface active agent (Solgen 70 [5]) | 0.5 |

[4] Kogum: Trade name of a product of Kobunshi Kagaku Kogyo.
[5] Solgen 70: Trade name of a product of Diiichi Kogyo Yakuhin.

The ingredients mixed in the proportions set forth above are milled in the same manner as in Formulation 1 and the mixture is added to 50 parts by weight of lukewarm water at 40–60° C. before use to prepare a paste.

EXAMPLE 1

The compositions shown in Formulation 1 and 2 were individually applied in a thickness of about 2 mm. to the surface of a 6 mm. thick steel sheet, having mill scale over the entire area thereof, by means of a spatula, and left to stand for 4 hours at normal temperature whereby a dry, continuous film was formed. Upon removing the film, a fresh metal surface completely free of mill scale was obtained. The steel sheet was left to stand in the room, but no rust was formed thereon even after 7 days. This is because an inactive film of iron salt complex compound is formed on the treated fresh surface by polymerized phosphoric acid or citric acid, which has an anti-corrosive effect. The fresh surface after the treatment is particularly effective as undercoating. Namely, an oily, rubber chloride, epoxy resin, polyurethane and phenol formaldehyde type resin anticorrosive coatings were each coated twice on the surface and the coatings were subjected to adhesion and salt water resistance tests, but the results were not inferior at all as compared with the case wherein the surface was treated mechanically as by conventional sand blasting, and rather slightly superior to the latter in respect to corrosion resistance.

As described above, the present invention is concerned with peelable compositions for pickling which are composed of a film-forming agent, and a solid acid and an iron dissolution promotor blended therewith, said filmforming agent consisting essentially of sodium alginate, having the property of gelling by the influence of an acid and the iron salt formed by said acid, and gelatin, with starch, a water-soluble resin and a penetrant added thereto. By mixing the compositions with lukewarm water, a pickling treatment can be attained very simply and in addition, since no liquid is used until immediately before the use, the costs of the container and transportation are very low and thus a reduction of cost can be achieved. Additionally, the compositions are stored in the form of powder, they will not deteriorate for a long period of time and the stability during storage can be markedly improved.

The proportions of materials can range as follows by weight.

| | Percent |
|---|---|
| Sodium alginate | 14–21 |
| Gelatin | 0.6–1 |
| Starch | 32–45 |
| Water-soluble resin | 1–2 |
| Solid acid | 10–37 |
| Dissolution promoter | 1–2 |
| Surface active agent | 0.5–1 |

As the solid acid there can be used any solid acid which can impart a pH of 3 or below. Thus in addition to ultraphosphoric acid, polyphosphoric acid and citric acid, there can be used, for example, malic acid, tartaric acid, oxalic acid.

Any conventional nonionic, anionic or cationic surface active agent can be used as the penetrant. Examples of anionic surface active agents include sodium lauryl sulfate and sodium dodecyl benzene sulfonate, as well as Lavelin S and Lavelin L. Examples of cationic surfactants are cetyl dimethyl benzyl ammonium chloride as well as Catiogen H and Catiogen L.

The aqueous solution used for pickling can contain 50 to 70% solids.

What is claimed is:
1. A dry peelable composition for pickling consisting essentially of a film-forming agent consisting essentially of (1) 14 to 21% sodium alginate, (2) 0.6–1% gelatin, (3) 32–45% starch and (4) 1 to 2% water-soluble resin selected from the group consisting of polyacrylamide, methyl cellulose, sodium carboxymethyl cellulose, water soluble alkyl resin, water soluble phenol formaldehyde resin, water soluble melamine formaldehyde resin and water soluble acrylic resin, a solid acid selected from the group consisting of polyphosphoric acid, citric acid, malic acid, tartaric acid and oxalic acid which can impart a pH in water of below 3, 1 to 2% an iron dissolution promoter selected from the group consisting of acid ammonium fluoride and stannous chloride, and 0.5 to 1% a penetrant selected from the group consisting of nonionic, anionic and cationic surface active agents, all percentages by weight.
2. A composition according to claim 1 wherein the proportion of the solid acid is 10 to 37%.
3. A composition according to claim 1 wherein the penetrant is a nonionic surface active agent.
4. A composition according to claim 1 wherein the solid acid is selected from the group consisting of polyphosphoric acid and citric acid.
5. A method of pickling steel comprising applying to the steel an aqueous mixture of the composition of claim 4, wherein the solids comprise 50–70% of the mixture.

References Cited

UNITED STATES PATENTS 3,553,016  1/1971  Foelsch _____ 252—142
2,337,062  12/1943  Page, Jr. _____ 252—142 UX MAYER WEINBLATT, Primary Examiner U.S. Cl. X.R.

134—3, 4, 41, 42; 252—136, 316, 317